Jan. 31, 1933.  R. L. MORSE  1,895,937

MAP

Filed Feb. 1, 1932

INVENTOR.
Ralph L. Morse.
BY
ATTORNEY.

Patented Jan. 31, 1933

1,895,937

UNITED STATES PATENT OFFICE

RALPH L. MORSE, OF SPRINGFIELD, MASSACHUSETTS

MAP

Application filed February 1, 1932. Serial No. 590,087.

This invention relates to improvements in the method of making maps and the product thereof.

The principal objects of the invention are directed to the provision of a novel method for making a map which is not only curved to represent the curvature of the earth's surface but it carries as well such geographical designations and indicia as presents a true representation of that portion of the earth's surface which it is intended to represent.

According to another feature of the invention the map is made from separately formed map-sections which are joined together in a novel way and according to a further feature of the invention the map sections are formed to illustrate the contour of that section of the earth's surface which is represented by the map.

Figure 1:
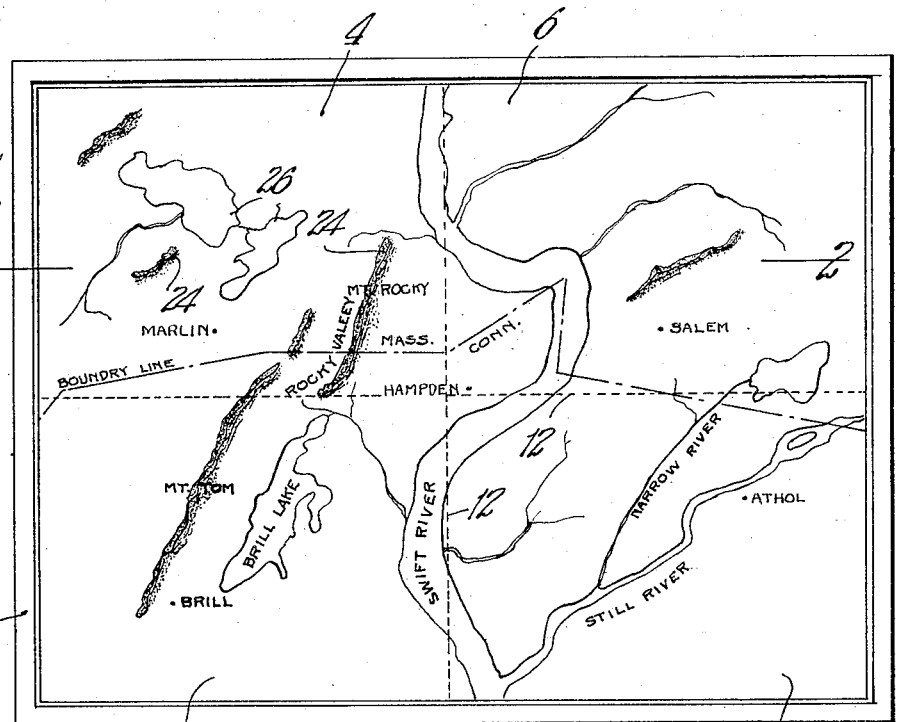
Figure 2:
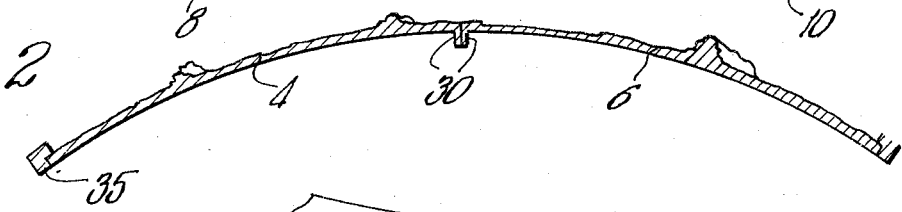
Figure 3:
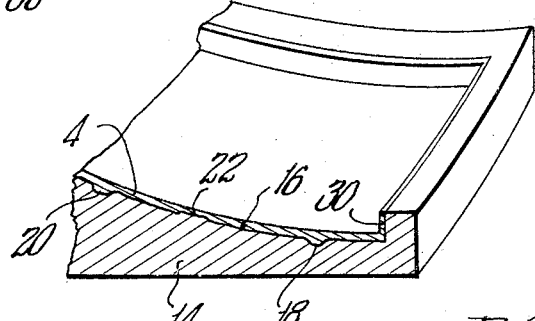

Various novel features and advantages of the invention will be more fully hereinafter referred to in connection with the accompanying description of the preferred form thereof reference being had to the accompanying drawing wherein:

Fig. 1 is a plan view of a map made in accordance with the novel method of the invention and includes certain novel features, Fig. 2 is a sectional view taken on the line 2—2 of Fig. 1, and Fig. 3 is a fragmentary sectional and perspective view through a mold for making map-sections according to the invention.

Referring now to the drawing more in detail the invention will be fully described.

In Fig. 1 there is represented a map 2 which may be formed from a plurality of separate map-sections, indicated by 4, 6, 8 and 10. The map-sections are preferably made separately and are subsequently joined together in the manner to be described as along the dotted lines indicated by 12.

By forming a map from several map-sections it facilitates the ready and easy formation of a unitary structure as is desirable in order to manufacture the maps economically.

In Fig. 3 there is shown a section or a portion of a mold 14 which has an upper curved surface 16. This surface is preferably curved in such a way as to represent the curvature of the earth's surface and bears a correct relation to the geographical designations to be applied to the surface of the map. This surface is provided with cavities or depressions such as 18, 20 and other more or less elevated portions 22. These are made in all their important respects so as to illustrate at a relatively small scale the contour of the earth or that part of the earth's surface for which the particular mold is to be used.

In the form of the invention shown it will be desirable of course to provide a plurality of different molds in order to make the separate sections. By employing a plurality of separate molds for separate map sections it is possible to make up a map using as many of the sections as may be desired.

According to a special feature of the invention molding material for the map-sections may be of any inexpensive moldable material and this is poured into the mold so as to form a relatively thin layer. The material will flow into the cavities so that the map-section when molded has portions in relief or projections such as mountains 24 and relatively lower parts for lakes 26, etc. These correspond to the cavities 18, 20 and elevated portions 22. In this way a map section is formed in the mold so that it will have the desired contour and natural uneven effect. Since the mold's surface 16 is curved the map section will be generally curved as is desired.

According to another feature of the invention it is desired to provide flanges such as 30 at marginal edges of the map-sections which may be prepared in some suitable manner, as by grinding, so that the flanges may be secured together by an adhesive or other means to thereby unite the adjacent sections and form a unitary map of any desired size from a plurality of relatively small sections.

When the sections are joined together as shown, it may be desirable to embrace the same by a frame represented generally by 35. This will protect the edges of the map sections and at the same time bind the sections together as is desired.

By reference to the foregoing it will be observed that map sections are formed not only to have the curvature of the earth but each section may have projections and indentations which are relatively so arranged as to be a true representation of that part of the earth's surfaces which it is desired to represent. By making the map of several sections which may be joined together it is not only possible to provide unitary maps in an economical manner, but maps which are accurate in all their important respects.

With the sections made after the manner described and either before or after they are joined together the surface of the map sections may be decorated or ornamented in some convenient manner with geographical indicia. The indicia may indicate the names of cities such as Brill and Athol and the names of lakes and rivers such as Brill Lake or Swift River all as shown. Different sections of the map's surface may be colored with different colors when it is desired to create different effects. The decorating may be done in various ways as by printing, stenciling, painting, or otherwise as will best produce the desired effects.

Various changes may be made in the form of the invention without departing from the spirit and scope thereof and therefore what I desire to claim and secure by Letters Patent of the United States is:

The method of making a map which consists in, forming separate relief map sections having flanges on their marginal edges by coating with plastic material separate molds having flanges on their marginal edges, the surfaces of said molds being curved to represent the curve of the earth's surface and provided with cavities and ridges to represent the contour of that section of the earth's surface which the mold represents, securing together the said marginal flanges of said separate map sections to form a unitary map, the curved surfaces of said sections uniting to form a unitary map and co-operating with each other to present a continuous surface having the curvature of the earth's surface, and then applying geographical designations to said curved surface.

In testimony whereof I affix my signature.

RALPH L. MORSE.